United States Patent

[11] 3,610,608

| [72] | Inventor | William E. Horton |
| | | 1325 Jessia St., Las Vegas, Nev. 89104 |
| [21] | Appl. No. | 832,959 |
| [22] | Filed | June 13, 1969 |
| [45] | Patented | Oct. 5, 1971 |

[54] SAFETY DEVICE
1 Claim, 4 Drawing Figs.

[52] U.S. Cl........................................... 267/136,
152/158, 152/285, 267/180
[51] Int. Cl......................................... B60c 17/04
[50] Field of Search............................. 152/158,
92, 13, 17, 87, 284–288; 267/180, 167, 136;
138/129, 134, 135, 154

[56] References Cited
UNITED STATES PATENTS
840,766  1/1907  Greenfield................... 138/135

| 854,655 | 4/1907 | Krell............................ | 152/92 |
| 2,515,365 | 7/1950 | Zublin......................... | 138/154 |
| 578,258 | 3/1897 | Nelson........................ | 152/285 |

Primary Examiner—Arthur L. La Point
Assistant Examiner—George H. Libman
Attorney—Conrad C. Caldwell ABSTRACT: The invention relates to a safety device for insertion in automobile pneumatic tires and comprises a helical coil of ribbonlike material having its ends joined to form a toroid. The ribbonlike material is formed with a plurality of laterally extending fingerlike projections defining alternate notches whereby the fingers of each loop of the helical coil interfit into the notches of adjacent loops and underlie the adjacent ribbons to thereby interlock the relative position of adjacent loops.

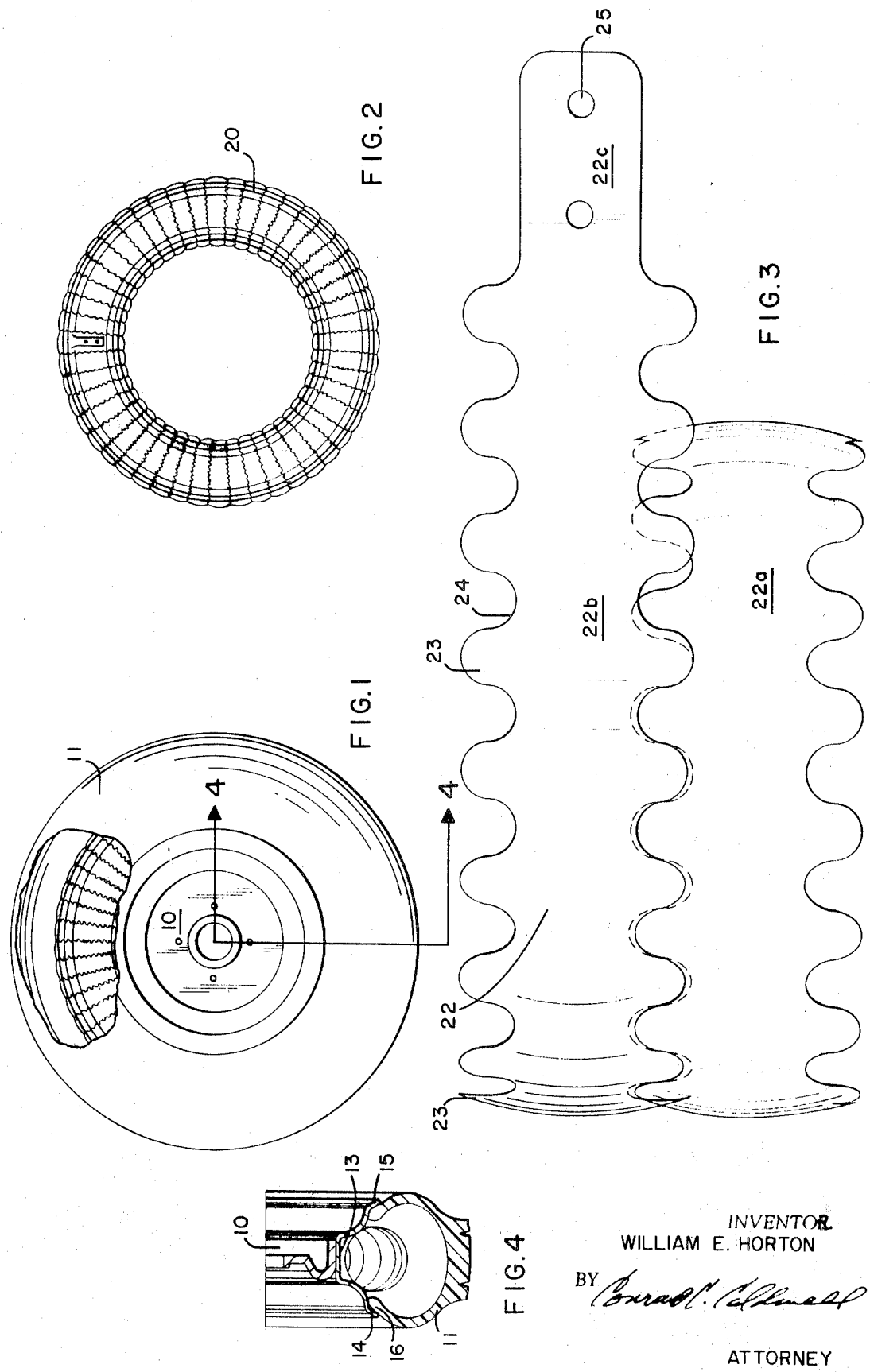

SAFETY DEVICE

This invention relates to an automobile safety device and has more particular reference to an insert to be placed around a wheel inside a pneumatic tire.

In order to make modern motor vehicles ride more comfortably, manufacturers of automobiles and tires have turned increasingly to larger, lower pressure tires, and particularly tires with flexible sidewalls. When such tires suddenly lose their pressure there is serious danger to the stability of the vehicle because of the differential in the diameter between the rim on which the tire is mounted and the outer circumference of the tire itself when inflated.

One of the objects of this invention is to provide a safety device which when used in combination with the wheel rim upon which the tire is mounted, prevents a substantial decrease in the circumference of the combination when the tire loses its internal pressure.

Other devices designed to accomplish this result are known to the art, however, most of such devices are ineffective or impractical. Some of them take form of an integral flange forming a part of the wheel and projecting outwardly into the body of the tire. Such flanges render mounting a tire exceedingly difficult if not impossible.

A further object of my invention is to provide a safety device which can be mounted on or removed from the wheel at will to facilitate mounting a tire.

Further objects and advantages will become apparent from the drawings and specifications descriptive thereof.

In the drawings

FIG. 1 is a side elevation of a tire mounted on a rim having part of its sidewall cut away to show the safety device mounted in the interior of the tire;

FIG. 2 is a side elevation of a safety device embodying the principles of my invention;

FIG. 3 is an enlarged fragmentary view showing the details of interlocking fingers;

FIG. 4 is a sectional view taken on line 4—4 of FIG. 1.

In FIG. 1 I have illustrated a standard automobile wheel designated generally 10 having a standard low pressure pneumatic tire 11 mounted thereof. As will be seen in FIG. 4 the wheel includes an outer rim having a "drop center" well 13 and side flanges 14 and 15.

The pneumatic tire 11 is provided with beads such as 16 adapted to fit inside the flanges 14 and 15.

In order to prevent the tire from collapsing into the well 13 upon loss of pneumatic pressure I have provided a safety device comprising a toroid-shaped insert designated generally 10 (see FIG. 2) which is composed of a single band of flexible material, preferably spring steel, wrapped in a helical coil to form the toroid. The band 22 is formed with a plurality of outwardly extending fingers 23 having outwardly converging edges, the fingers being spaced apart to define notches 24 on each lateral edge thereof.

As will be seen from the extreme left-hand end of FIG. 3 the contour of the band 22 is convex to the exterior to thereby cause the fingers 23 to bend slightly inwardly.

The fingers 23 and notches 24 are proportioned so that the fingers 23 on one loop such as 22a will register with the notches on the next loop such as 22b and will extend inwardly to form an interlocking relationship.

The end of the continuous strip 22 is formed with a fastening tab such as 22c having apertures such as 25 therethrough for the purpose of securing the two ends together. The securing of the ends together can be accomplished by any suitable means such as blind, expandable rivets.

After completion and heat treating the toroid 20 can be stretched so that it will fit over the flanges 14 or 15 and into the well 13. In the event that the tire 11 loses its pneumatic pressure or inflation, the car will be supported by toroid 20. Also, the positioning of the toroid 20 in the well 13 will prevent the beads 16 from collapsing into the well 13 to thereby retain the tire on the rim and avoid serious consequences and loss of stability of the vehicle.

The foregoing specification is illustrative of what I consider the most practical and the preferred embodiment of my invention. It is recognized that modifications of detail may be incorporated without departing from the true scope of the invention, which is defined and set forth in the appended claim.

I claim:

1. A safety device for insertion in a pneumatic tire comprising:

A helical coil having a plurality of concentric loops and having its ends joined to form a toroid said helical coil being formed of resilient ribbonlike material, said ribbonlike material being concave on its inner surface and having a plurality of outwardly extending fingerlike projections defining inwardly extending notches between successive fingers, each said finger having outwardly converging edges, the spacing of said fingers and notches being such that the fingers of each loop interfit into the notches of each adjacent loop and underlie each adjacent loop.